Figure 1:
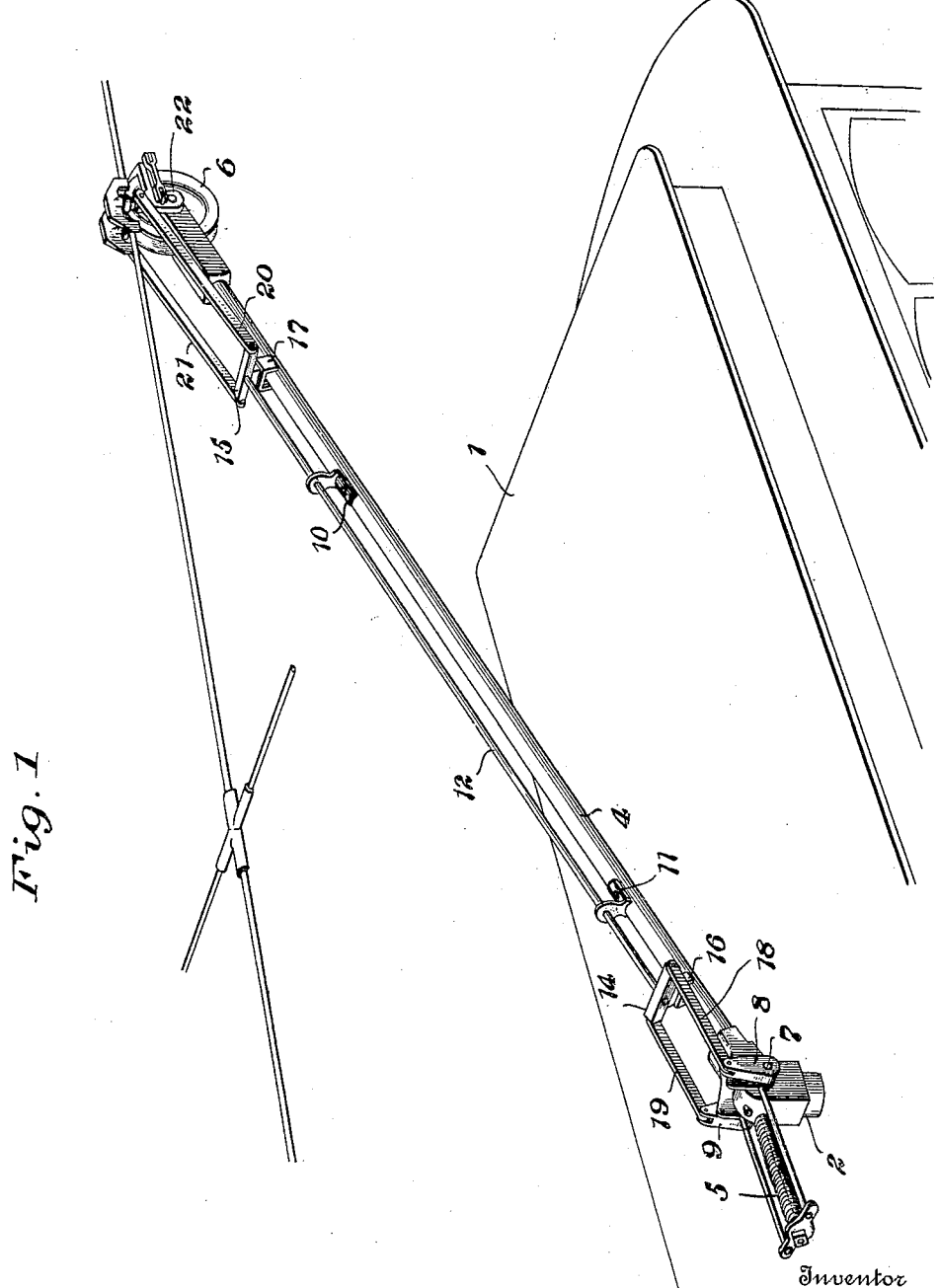

E. E. KELLEY.
TROLLEY WHEEL GUARD.
APPLICATION FILED JUNE 7, 1910.

979,311.

Patented Dec. 20, 1910.
2 SHEETS—SHEET 1.

Witnesses
J. Adolph Bishop
M. B. Nichols

Inventor
Eugene E. Kelley
By W. W. Evarts
Attorney

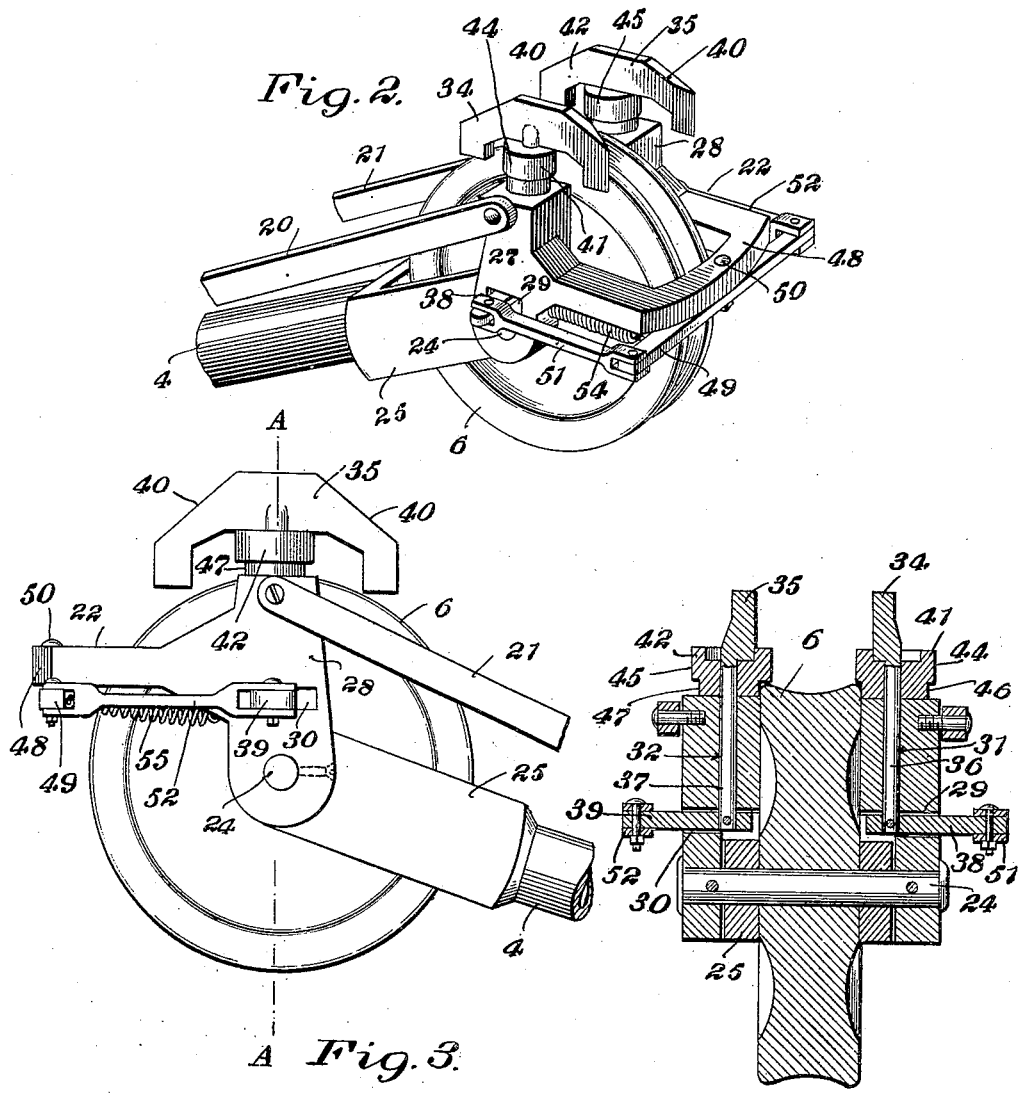

UNITED STATES PATENT OFFICE.

EUGENE E. KELLEY, OF GREENSBURG, PENNSYLVANIA.

TROLLEY-WHEEL GUARD.

979,311.   Specification of Letters Patent.   Patented Dec. 20, 1910.

Application filed June 7, 1910. Serial No. 565,541.

*To all whom it may concern:*

Be it known that I, EUGENE E. KELLEY, a citizen of the United States, and a resident of Greensburg, in the county of Westmoreland and State of Pennsylvania, have invented certain new and useful Improvements in Trolley-Wheel Guards, of which the following is a specification.

This invention relates broadly to trolley connections for electric vehicles and specifically to a trolley wheel guide adapted to prevent the trolley wheel from leaving the trolley wire when crossing switches.

Another object of my invention is to construct a contact mechanism arranged to give a minimum degree of wear to the trolley wire.

A still further object of my invention is to construct a trolley wheel with a wide contact face and friction guard wheels to prevent the trolley from leaving the trolley wheel.

A still further object of my invention is to construct a trolley guard or trolley wheel with guard members so arranged as to automatically adjust themselves with relation to the trolley wire when the car is rounding curves.

A still further object of the invention is to construct a trolley wheel with guard fingers that are automatically maintained in a vertical relationship to the trolley wheel, and which guard fingers are constructed to prevent the trolley wheel from leaving the trolley wire when it passes under switch pans, etc.

Other and further objects of my invention will in part be obvious and will in part be pointed out in the appended claims.

Throughout the specification and drawings like numerals are used to represent like parts.

Figure 1 is a detail perspective showing my trolley guard in operative relation to a roof of a street car and trolley wire. Fig. 2 is a detail perspective of a trolley wire guide. Fig. 3 is a side elevation of a trolley wire guide. Fig. 4 is a section taken on line A—A of Fig. 3.

In the operation of fast running electric cars provided with overhead trolleys, there is always a great deal of annoyance caused by the tendency of the trolley wheel to leave the trolley wire, particularly when the trolley wire is not supported a uniform distance above the road bed. Oftentimes when the trolley wheel does leave the trolley wire the trolley pole breaks the supporting wires for the trolley wire and much damage is consequently done because of the trolley wheel leaving the trolley wire when the car is running at a high rate of speed. In the ordinary well known construction, the trolley wheel is usually formed with a deep groove in order to prevent it from leaving the trolley wire. In such a construction, when the trolley wheel is rounding a curve, a great deal of friction is caused between the side of the trolley wheel and the edge or side of the trolley wire. This has a tendency to cause heavy wear upon the expensive copper trolley and also has a tendency to cause sparking, thereby burning up both the wheel and the wire. My invention obviates the disadvantages hereinbefore pointed out, in connection with the ordinary trolley wheel.

Referring particularly to Fig. 1, the trolley pole is shown as mounted upon the top of a car roof 1, by means of a pedestal 2, which may be mounted in any well known construction. The car roof and the pedestal mount for the trolley pole do not form a specific part of my invention, and therefore they are shown in a more or less diagrammatic manner. The trolley pole 4 is counter-balanced by the usual spring construction 5, and carries at its outer end a trolley wheel 6, which will be more specifically described hereinafter. A pin 7 is fixedly mounted in the pedestal 2, and carries fixedly upon its outer ends two stationary crank members 8 and 9. The trolley pole is provided with elbow brackets 10 and 11, which are adapted to carry and guide a connecting rod 12, which terminates at its lower end in a cross arm 14, and at its upper end in a similar cross arm 15. Each of the cross arms 14 and 15 is provided with sliding blocks 16 and 17 respectively, that are adapted to prevent the cross arms from turning and also have a tendency to brace the cross arms 14 and 15. The lower cross arm 14 is operatively connected with the crank members 8 and 9 by means of connecting links 18 and 19. It will be seen that the construction and arrangement of parts including the pedestal, the lower end of the trolley pole, the lower cross arm, crank members, etc., is such that when the trolley pole moves in a vertical plane, the connecting rod 12 is given a reciprocating motion.

Attention is now directed to Figs. 2, 3 and 4. The upper cross arm 15, is provided with connecting links 20 and 21, which are operatively connected with a guard frame 22, which is pivotally mounted upon a cross pin 24, that is adapted to pass through a harp arm 25 and form a pivotal mount for a trolley wheel 6. It will be seen that by means of the connection hereinbefore delineated, that when the trolley pole is moved in a vertical plane, the crank arms 27 integral with the guard frame, will be maintained in a vertical plane. The crank arms 27 and 28 are each provided with a slot 29 and 30. Openings 31 and 32, are formed in the crank arms 27 and 28 in the direction of their longitudinal axes. Guard arms 34 and 35 are provided with stems 36 and 37 which pass through the openings 31 and 32 respectively, and are provided on their lower ends with lever arms 38 and 39. The lever arms 38 and 39 may be riveted upon the stems 37 and 38, or they may be attached thereto by any well known attaching means. The guard arms 34 and 35, are provided with angular upper face portions so arranged as to guide the trolley wheel under a switch pan or under a cross trolley where tracks cross each other. The interior ends of the guide forks are also beveled as at 40 in order that the guard arms will not present an abutting face that might be struck by the ordinary trolley support. The upper faces of the crank arms 27 and 28, are formed with flat surfaces and are arranged to carry guard wheels 41 and 42. The guard wheels 41 and 42 are pivotally mounted upon the stems 34 and 35 respectively, of the guard arms. The guard wheels 41 and 42 are provided with large cylindrical faces 44 and 45, and are cut away at 46 and 47 in order that the edges of the trolley wheel 26 may be brought in close relationship to the cylindrical faces 41 and 42 on the guard wheel. It will be noted that the trolley wheel 26 is provided with a very slight groove upon its contact surface, and that the guard wheels 41 and 42 are designed specifically to prevent the trolley wire from leaving the trolley wheel. The guard frame 22 is formed with a U-shaped portion 48, which bridges from the crank arm 27, around the trolley wheel to the crank arm 28. The outer portion of the U-shaped member 48 carries a rocking arm 49, which is pivotally mounted upon a bolt or rivet 50. The ends of the rocking arm 49 are pivotally connected with the lever arms 38 and 39 respectively, by means of links 51 and 52. Coiled springs 54 and 55 are arranged in balanced relationship on each side of the pivotal mount 50 for the rocking arm 49, the spring 54 having one end attached to the crank arm 27, its other to the rocking arm 49, and the spring 55 occupying a similar relationship between the crank arm 28 and the rocking arm 49.

From the construction of parts hereinbefore set forth, it will be obvious that when one of the guard arms is turned the other guard arm will be turned a like degree because of the connecting links 51 and 52 and the rocking arm 49. Immediately as pressure is released against the guard arm, the several parts will be brought to normal position by means of the coiled springs 54 and 55.

Having thus described my invention what I claim is:—

1. In a device of the character described, the combination of a pedestal, a trolley pole pivotally mounted upon said pedestal, a trolley wheel carried by said trolley pole, a guard frame pivotally mounted upon said trolley pole, guard arms mounted in said guard frame, means for normally maintaining said guard arms parallel to the length of said trolley pole, and means for maintaining the axes of said guard arms in a vertical plane.

2. In a device of the character described, the combination of a pedestal, a trolley pole pivotally mounted in said pedestal, a flat faced trolley wheel carried by said trolley pole, a guard frame pivotally mounted to rotate about the axis of the trolley wheel, guard arms pivotally mounted in the guard frame, guard wheels mounted to rotate about the axes of the guard arms, means for causing said guard arms to move simultaneously, and means for maintaining the axes of said guard arms in a vertical plane.

3. In a device of the character described, the combination of a pedestal, a trolley pole pivotally mounted in said pedestal, said trolley pole being provided with a fork, a trolley wheel mounted in the fork carried by said trolley pole, a guard frame pivotally mounted upon said trolley pole to vibrate around the axis of the trolley wheel, longitudinally extending guard arms rotatively mounted in said guard frame, cylindrically faced guard wheels mounted to rotate about the axes of the guard arms and means for maintaining the axes of said guard arms in substantially a vertical plane.

4. In a device of the character described, the combination of a pedestal, a trolley pole pivoted upon said pedestal, a trolley wheel mounted upon said trolley pole, crank arms fixedly mounted upon said pedestal, a guard frame mounted to rotate upon the axis of the trolley wheel, guard wheels carried by said guard frame, guard arms constructed to pivot about the axes of the guard wheels, operative means connecting said crank arms and said guard frame in such manner as to maintain the axes of the guard arms in substantially vertical relationship.

5. In a device of the character described, the combination of a pedestal, a trolley pole pivotally mounted upon said pedestal, a trolley wheel carried by said trolley pole, a guard frame pivotally mounted to rotate about the axis of said trolley wheel, guard wheels carried by said guard frame, beveled ended guard arms pivotally mounted in said guard frame, means for causing said guard arms to rotate simultaneously, and means for counterbalancing the rotation of said guard arms.

6. In a device of the character described, the combination of a pedestal, a trolley pole pivotally mounted upon said pedestal, counterbalancing means for said trolley pole, a flat faced trolley wheel carried in the outer end of said trolley pole, guard wheels mounted adjacent the contact point of said trolley wheel, a guard frame for carrying said guard wheels, pivotally mounted guard arms above said guard wheels, means for causing said guard arms to rotate simultaneously, counterbalancing means to maintain said guard arms in normal position, and means for maintaining the axis of said guard arms in substantially vertical relationship.

EUGENE E. KELLEY.

Witnesses:
J. HILARY KEENAN,
J. A. WALTON.